US010224864B2

(12) United States Patent
Arasaki

(10) Patent No.: US 10,224,864 B2
(45) Date of Patent: Mar. 5, 2019

(54) SOLAR CELL MODULE MOUNTING DEVICE

(71) Applicant: Solar Frontier K.K., Tokyo (JP)

(72) Inventor: Mitsuru Arasaki, Tokyo (JP)

(73) Assignee: SOLAR FRONTIER K.K., Tokyo (JP)

( * ) Notice: Subject to any disclaimer, the term of this patent is extended or adjusted under 35 U.S.C. 154(b) by 0 days.

(21) Appl. No.: 15/570,588

(22) PCT Filed: Apr. 27, 2016

(86) PCT No.: PCT/JP2016/063247
§ 371 (c)(1),
(2) Date: Oct. 30, 2017

(87) PCT Pub. No.: WO2016/175253
PCT Pub. Date: Nov. 3, 2016

(65) Prior Publication Data
US 2018/0138855 A1    May 17, 2018

(30) Foreign Application Priority Data

Apr. 30, 2015 (JP) ................................ 2015-093629

(51) Int. Cl.
*H02S 20/23* (2014.01)
*H02S 30/10* (2014.01)

(52) U.S. Cl.
CPC .............. *H02S 20/23* (2014.12); *H02S 30/10* (2014.12); *Y02B 10/12* (2013.01)

(58) Field of Classification Search
CPC .......... H02S 20/23; H02S 30/10; Y02B 10/12
See application file for complete search history.

(56) References Cited

U.S. PATENT DOCUMENTS

| 5,460,660 A * | 10/1995 | Albright ................. H02S 30/10 |
| | | 136/251 |
| 8,511,008 B2 * | 8/2013 | Sagayama .............. F24J 2/5207 |
| | | 136/244 |
| 9,951,972 B2 * | 4/2018 | Miyamoto .............. H02S 30/10 |

(Continued)

FOREIGN PATENT DOCUMENTS

| JP | 2002-276096 A | 9/2002 |
| JP | 2002-294958 A | 10/2002 |

(Continued)

OTHER PUBLICATIONS

International Search Report for PCT/JP2016/063247; dated Jul. 5, 2016.

*Primary Examiner* — Rodney Mintz
(74) *Attorney, Agent, or Firm* — Hauptman Ham, LLP

(57) ABSTRACT

A solar cell module mounting device for installing, onto a mounting surface, a solar cell module having a first end section and a second end section that extend parallel to each other, is provided with: a beam member having a first support section for supporting the first end section of the solar cell module, and a second support section for supporting the second end section of another solar cell module located adjacent to the solar cell module; and a fixture that supports the beam member, is affixed to the mounting surface, and is formed so as to be affixed to the mounting surface by a fastener on the side of the beam member where the first support section, and not the second support section, is provided.

16 Claims, 18 Drawing Sheets

(56) References Cited

U.S. PATENT DOCUMENTS

2011/0146763 A1* 6/2011 Sagayama .............. F24J 2/5207
                                                               136/251
2012/0192926 A1   8/2012 Kambara et al.
2017/0328602 A1* 11/2017 Miyamoto .............. H02S 30/10

FOREIGN PATENT DOCUMENTS

| JP | 2007-177466 A | 7/2007 |
| JP | 2008-088689 A | 4/2008 |
| JP | 2011-153465 A | 8/2011 |
| JP | 2011-220018 A | 11/2011 |
| JP | 2013-227859 A | 11/2013 |
| JP | 2013-231292 A | 11/2013 |
| JP | 2015-028264 A | 2/2015 |

* cited by examiner

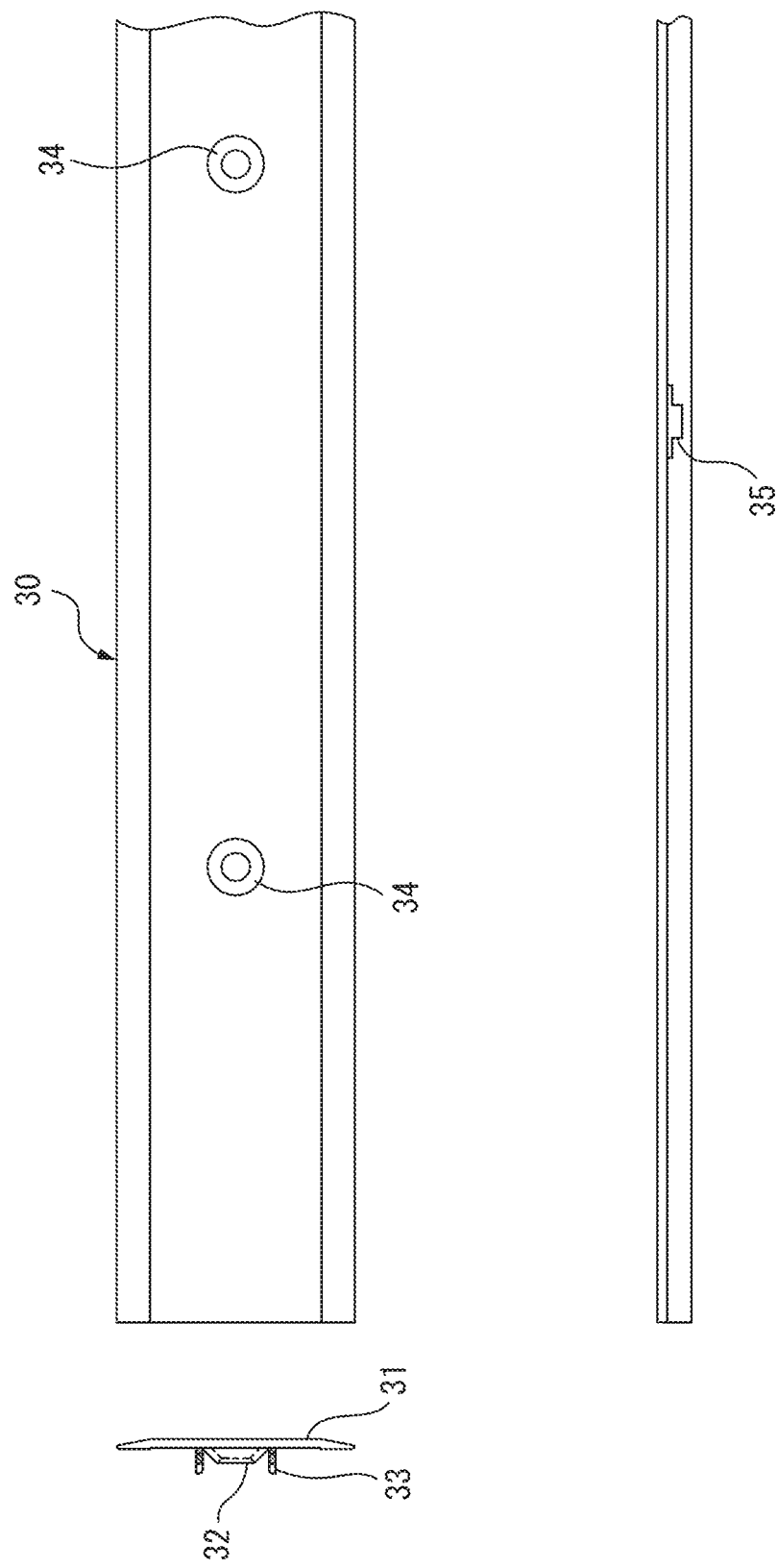

SOLAR CELL MODULE MOUNTING DEVICE

RELATED APPLICATIONS

The present application is a National Phase of International Application Number PCT/JP2016/063247, filed Apr. 27, 2016, and claims priority to Japanese Patent Application Number 2015-093629, filed Apr. 30, 2015.

TECHNICAL FIELD

The present invention relates to a solar cell module mounting device for mounting a solar cell module on a roof or rooftop of a building or other installation surface.

BACKGROUND ART

A solar cell module mounting device for arranging and mounting a plurality of solar cell modules on a roof or rooftop of a building or other installation surface is proposed in PLT 1 and PLT 2. In PLT 1 and PLT 2, a plurality of vertical members extending in a sloping direction of the roof are fastened on the roof. The plurality of solar cell modules are arranged and fastened on the vertical members.

CITATION LIST

Patent Literature

PLT 1: JP2008-88689A
PLT 2: JP2011-220018A

SUMMARY OF INVENTION

Technical Problem

According to the mounting device shown in PLTs 1 and 2, at the time of installation work, the plurality of vertical members are arranged and fastened on the roof in parallel to each other, then the solar cell modules are placed, but if the plurality of vertical members are poor in parallelness, mounting of the solar cell modules can be obstructed. Therefore, in the mounting device disclosed in PLTs 1 and 2, parallelness of the vertical members has to be established with a relatively high precision. However, adjustment of the parallelness of the vertical members is difficult—particularly after placing the solar cell modules on the vertical members. This has become one of the causes of longer time required for installation work.

The present invention is made in consideration of the above problems in the prior art and has as its object the provision of a solar cell module mounting device able to shorten the time of installation work.

Solution to Problem

To achieve the above object, the present invention provides a solar cell module mounting device for mounting a solar cell module having a first end part and a second end part extending in parallel with each other onto an installation surface, the solar cell module mounting device comprising a beam member having a first support part for supporting the first end part of the solar cell module and a second support part for supporting a second end part of another solar cell module arranged adjoining the solar cell module and a fixture supporting the beam member and fastened to the installation surface, the fixture being formed so as to be fastened by fastening means to the installation surface on the side of the beam member where the first support part, not the second support part, is provided.

According to this, since the fixture is fastened to the installation surface at the side of the beam member with the first support part, in the state where the first support part is not supporting the solar cell module, an installer can easily adjust the position of the beam member or adjust the parallelness with another beam member arranged facing it.

In the present invention, the fixture may have a module support part supporting the first end part of the solar cell module. The module support part may extend longer than the first support part of the beam member in a direction perpendicular to a normal direction of a light receiving surface of the solar cell module and a longitudinal direction of the beam member. According to this, at the time of installation work, the first end part of the solar cell module can be supported by the module support part of the fixture extending longer than the first support part of the beam member, so the burden of the weight of the solar cell module which the installer has to support is greatly reduced.

In the present invention, the fixture may have a mounting base to be fastened by the fastening means to the installation surface and a first support column and second support column provided rising from the mounting base. The fixture may have a deformable region defined by a slot at the mounting base so that when the mounting base is fastened by the fastening means to the installation surface, a standing angle of the second support column changes and the first and second support columns grip the beam member.

In the present invention, the fixture may comprise a lower member and an upper member. The lower member may have a mounting base to be fastened by the fastening means to the installation surface, a first support column provided rising from the mounting base, a second support column extending generally parallel to the first support column, and a connecting part connecting the first and second support columns and may be formed so that when the mounting base is fastened by the fastening means to the installation surface, the second support column deforms upon receiving a reaction force from the installation surface while the upper member may have a beam support part supporting the beam member and hook parts and may be formed so that the displacement of the second support column of the lower member causes the hook parts and the beam support part to grip the beam member.

In the present invention, the module support part of the fixture may have an opening. A tie down member passing through the opening may be used so that an electrical cable led out from the solar cell module is held in the module support part.

In the present invention, the solar cell module mounting device may further comprise a retaining member which obstructs movement of the solar cell module in an upper surface direction when the light receiving surface of the solar cell module is referred to as an upper surface and which is detachably attached to the beam member.

In the present invention, the solar cell module mounting device may further comprise a cap attached to an end part of the beam member in the longitudinal direction so as to block movement of the solar cell module with respect to the beam member in the longitudinal direction of the beam member.

In the present invention, the solar cell module mounting device may comprise N+1 number of beam members for arranging one or more solar cell modules on each of a plurality of N number of arrangement axes arranged at intervals in parallel with the longitudinal direction of the beam member.

In the present invention, the solar cell module mounting device may further comprise a joint member for beam members and a plurality of the beam members may be connected each other in the longitudinal direction thereof by at least one joint member.

In the present invention, one of the plurality of the beam members may be replaced with a beam member for exclusive first end part supporting use having the first support part, but not having the second support part.

To achieve the above-mentioned object, the present invention provides a solar cell module system comprising a plurality of solar cell modules each having a first end part and a second end part extending in parallel with each other and a mounting device mounting the plurality of solar cell modules onto an installation surface while arranged aligned, wherein the mounting device comprises a plurality of beam members each extending along at least one of the first end parts and the second end parts of the solar cell modules and supporting the solar cell modules and a plurality of fixtures supporting the beam members and fastened to the installation surface, each of the plurality of beam members having a first support part for supporting the first end part of the solar cell module and a second support part for supporting the second end part of the solar cell module, each of the fixtures being formed so as to be fastened by fastening means to the installation surface on the side of the beam member where the first support part, not the second support part, is provided.

BRIEF DESCRIPTION OF DRAWINGS

FIG. 9 is a three-view drawing of an end part of the retaining member.

DESCRIPTION OF EMBODIMENTS

A solar cell module mounting device according to a first embodiment of the present invention (hereinafter referred to as a "mounting device") is for fastening a plurality of solar cell modules aligned on a roof of a house etc. The "solar cell module" in this case includes a solar cell module of a type shown in FIG. 1 comprised of a solar cell panel in which solar cell elements are sealed and frames fastened around the solar cell panel of course and also of a so-called frameless type with no such frames. Normally, a solar cell module is assembled complete in the factory.

Note for simplification of the explanation in the Description, the direction of the mounting device after placement will be defined as follows: a direction extending horizontally, that is normally the direction equal to the direction of extension of the eaves and ridge of a house, is the "X-direction", the direction of the maximum slope line of the roof is the "Y-direction", and the direction perpendicular to the X- and Y-direction and equal to the normal direction of a light receiving surface of a mounted solar cell module 200 is the "Z-direction".

Figure 1:
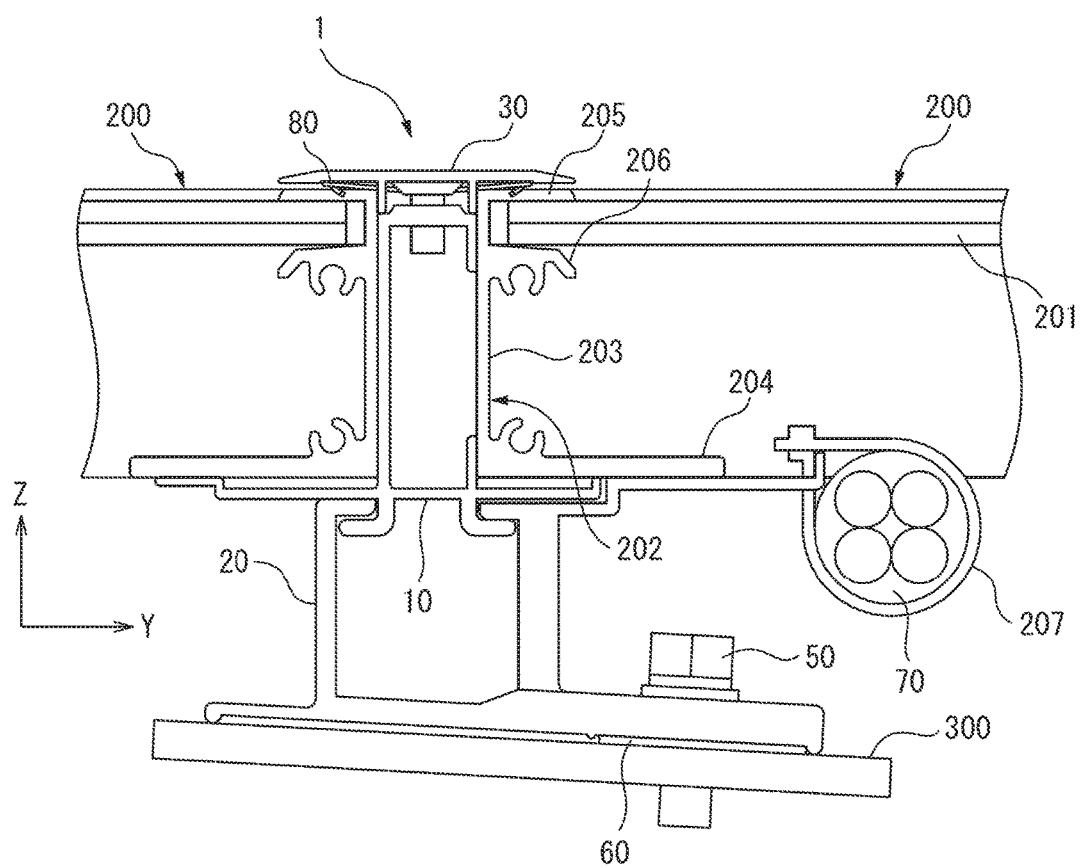
FIG. 1 is a cross-sectional enlarged view of a part of a solar cell module mounting device according to a first embodiment of the present invention to which solar cell modules are attached.

FIG. 1 is a cross-sectional enlarged view of part of a solar cell module mounting device 1 according to a first embodiment of the present invention to which solar cell modules 200 are mounted. The solar cell module 200 shown in FIG. 1 is comprised of a rectangular solar cell panel 201 at the four sides of which frames 202 formed from the same aluminum alloy extruded members are fastened. Each frame 202 of the solar cell module 200 has a vertical wall part 203 extending in the Z-direction, a base 204 at the bottoms of the vertical wall part 203 extending in the Y-direction while intersecting with the vertical wall part 203, a retaining part 205 at the topmost part extending in the Y-direction while intersecting with the vertical wall part 203, and a shelf part 206 at the lower side of the retaining part 205 extending in the Y-direction while intersecting with the vertical wall part 203. Between the retaining part 205 and the shelf part 206, grooves are formed in which an end of the solar cell panel 201 is inserted and fastened by an adhesive etc. However, it will be understood if referring to the explanation of the following embodiments that the solar cell module mounting device according to the present invention can also be applied to various solar cell modules other than the above-mentioned solar cell module 200 as well.

Figure 2:
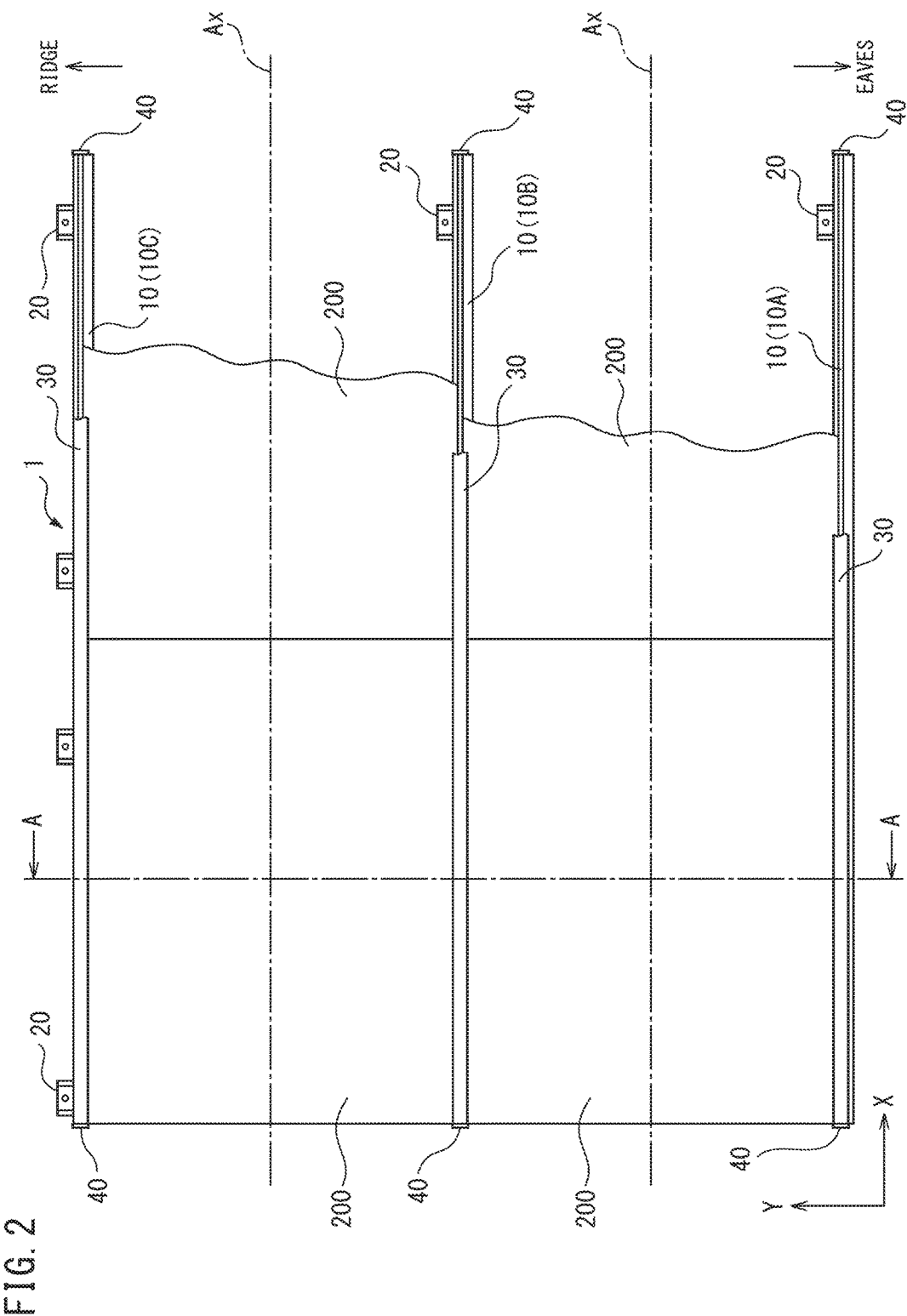
FIG. 2 is a partially cutaway plan view of the mounting device according to the first embodiment of the present invention to which solar cell modules are attached.
Figure 3:
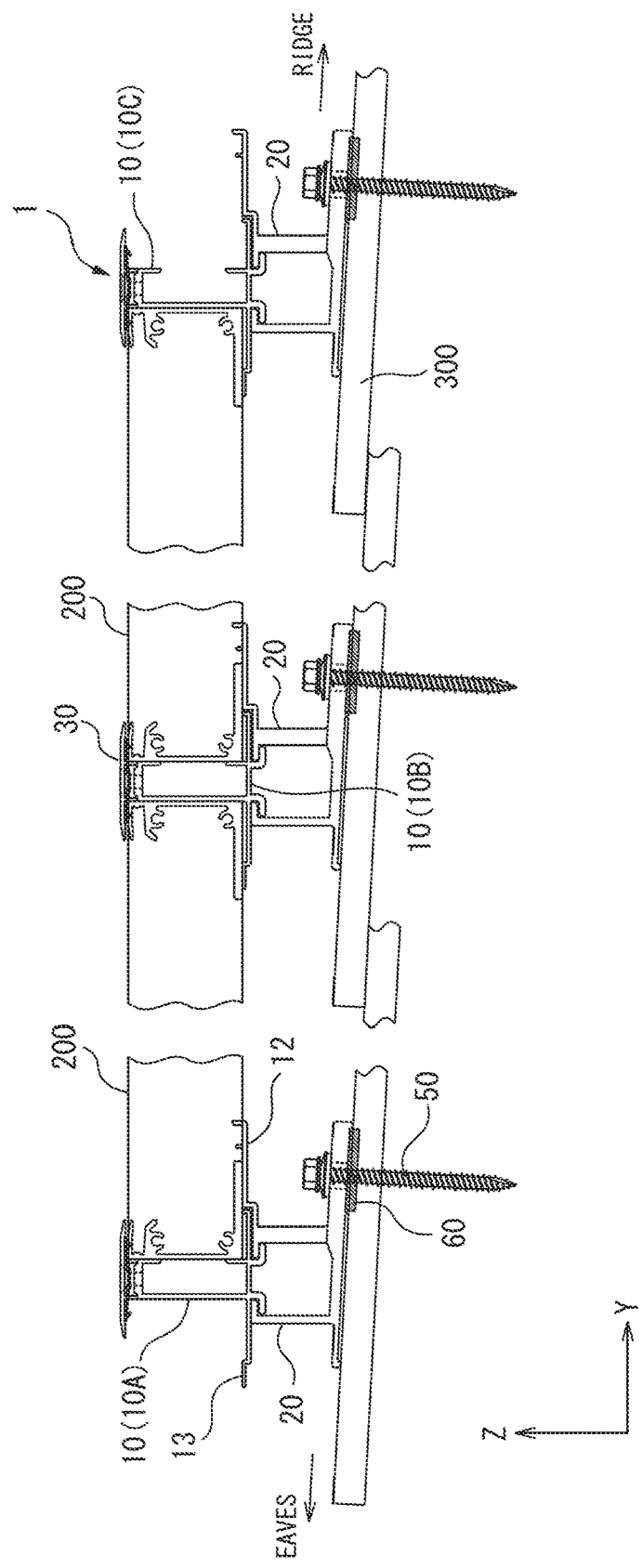
FIG. 3 is a cross-sectional view along A-A of FIG. 1.

The mounting device 1 according to the first embodiment of the present invention will be explained with reference to the drawings. FIG. 2 is a plan view of the mounting device according to the first embodiment to which four solar cell modules 200 are mounted. In FIG. 2, to facilitate understanding of the structure, parts of the solar cell modules 200 are removed. The installation surface of the roof is also not expressed. FIG. 3 is a cross-sectional view along A-A of FIG. 2. Here, a plurality of roof members 300 forming the installation surface are drawn. The mounting device 1 according to the first embodiment is one mounting on a roof a total of four solar cell modules 200, two each arranged on two arrangement axes Ax arranged at an interval in the Y-direction and extending in parallel with each other in the X-direction, and comprises three beam members 10, twelve (in FIG. 2, six of which are shown) fixtures 20, three retaining members 30, and six end caps 40.

The illustrated mounting device 1 has two arrangement axes Ax extending in parallel with the beam members 10 and fastens two solar cell modules 200 on each of the arrangement axes Ax. However, it will be clear that modifications of the embodiment where there are one or three or more arrangement axes Ax and where one or three or more solar cell modules 200 are arranged on each of the arrangement axes Ax are possible. For this reason, it will also be clear that numbers of the above-mentioned component elements may also change in accordance with the number of solar cell modules 200 to be mounted.

The three beam members 10 extend in parallel with each other in the X-direction along the two end parts of the solar cell modules 200 so as to be able to support mutually parallel two end parts of the solar cell modules 200. Note that the three beam members 10 are the same in the present embodiment, but are referred to by different names and reference notations according to the locations where they are arranged, that is, are referred to as, from the side near the eaves, the "first beam member 10A", "second beam member 10B", and "third beam member 10C". Further, when not necessary to differentiate these three in the explanation, they will be referred to as the "beam member 10".

The first beam member 10A supports first end parts of the two solar cell modules 200 arranged on the arrangement axis Ax at the side near the eaves (hereinafter, abbreviated as the "solar cell modules of the first row"), the second beam member 10B arranged at the middle supports second end parts of the two solar cell modules 200 of the first row and the first end parts of the two solar cell modules arranged on the arrangement axis Ax at the side near the ridge (hereinafter, abbreviated as the "solar cell modules of the second row"), and the third beam member 10C supports the second end parts of the two solar cell modules 200 of the second row. In this Description, the first and second end parts of the solar cell module 200 are two end parts in the Y-direction extending in parallel with each other. The first end part is the end part at the side near the eaves and the second end part is the end part at the side near the ridge.

Figure 4:
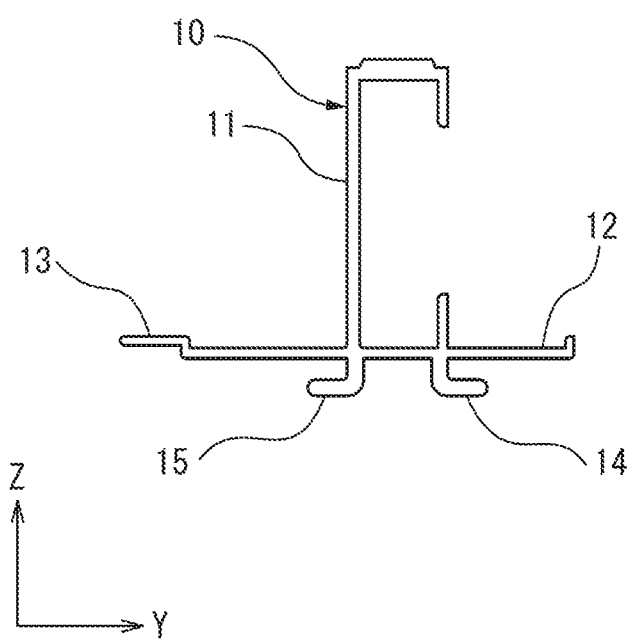
FIG. 4 is a cross-sectional view of a beam member of the solar cell module mounting device.

The beam member 10 in the present embodiment is formed as an extruded member made of an aluminum alloy. Its cross-sectional shape, as shown in FIG. 4, includes a main body part 11, a first support part 12 sticking out from the bottom part of the main body part 11 in the Y-direction to the right side in the figure, a second support part 13 sticking out to the left side, and a first angle part 14 and second angle part 15 extending downward from the bottom part of the main body part 11. The beam member 10 not only supports the solar cell module 200 in the Z-direction by its first support part 12 and second support part 13, but also acts to restrict movement of the solar cell module 200 in the Y-direction by its main body part 11.

The first support part 12 of the beam member 10 supports the first end part of the solar cell module 200, while the second support part 13 supports the second end part of another solar cell module 200. However, in the present embodiment, as clear from FIG. 3, the second support part 13 of the first beam member 10A and the first support part 12 of the third beam member 10C do not support solar cell modules 200.

Movement of the beam member 10 with respect to the fixture 20 in the Y- and Z-directions is blocked by fitting of the later explained first hook part 22a of a first support column 22 and a second hook part 23a of a second support column 23 of the fixture 20 with grooves formed between the first angle part 14 and the first support part 12 and between the second angle part 15 and the second support part 13 of the beam member 10. At the top end surface of the main body part 11 of the beam member 10, a plurality of holes (not shown) are provided for screwing in a later explained retaining member 30.

Figure 5B:
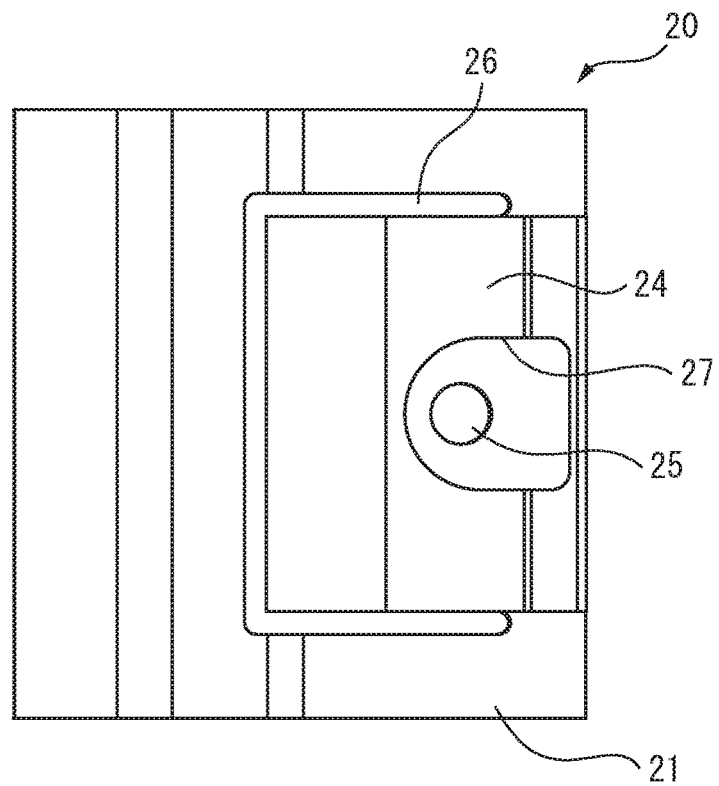
FIG. 5A shows a side view and FIG. 5B shows a plan view of a fixture of the solar cell module mounting device.
Figure 5A:
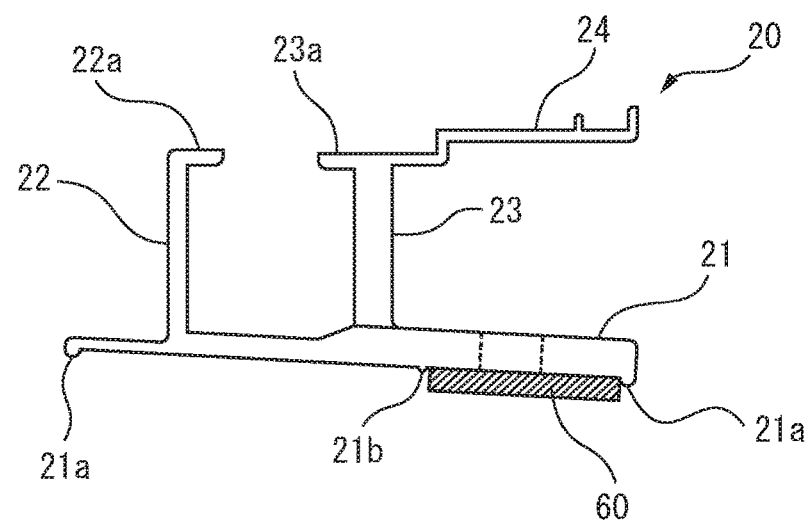
Figure 6:
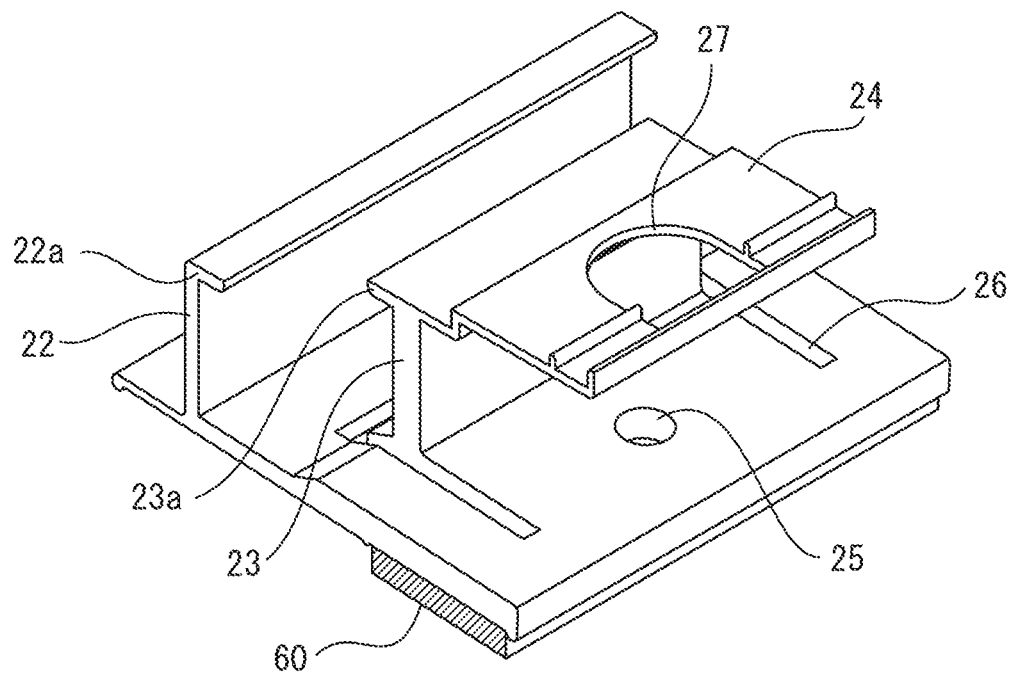
FIG. 6 is a perspective view of the fixture.

The fixture 20, as shown in FIGS. 5A-5B and FIG. 6, includes a mounting base 21 to be fastened to a roof or other installation surface, a first support column 22 and second support column 23 provided rising from the mounting base 21, that is, in the Z-direction of the mounting device 1, and a module support part 24 extending from the front end of the second support column 23 in the Y-direction. The mounting base 21 is arranged at the side of the beam member 10 with the first support part 12 when the fixture 20 and the beam member 10 are assembled. The front ends of the first support column 22 and second support column 23 are formed as the first hook part 22a and second hook part 23a, respectively, extending in a direction facing each other. The beam member 10 is supported by the top surfaces of the first hook part 22a and second hook part 23a.

The mounting base 21 is provided with a fastening hole 25 for passing a fastening means such as a screw or bolt etc. 50 (hereinafter, referred to as a "fastening screw 50"). The fastening hole 25 is provided at the right side in FIG. 5B, that is, below the module support part 24. At the bottom surface of the mounting base 21, three line-shaped projections 21a and 21b run. Two of the three line-shaped projections are end line-shaped projections 21a provided at the end parts, while one is a middle line-shaped projection 21b provided between the fastening hole 25 and second support column 23. The middle line-shaped projection 21b is formed with a height lower than those of the end line-shaped projections 21a.

Figure 7:
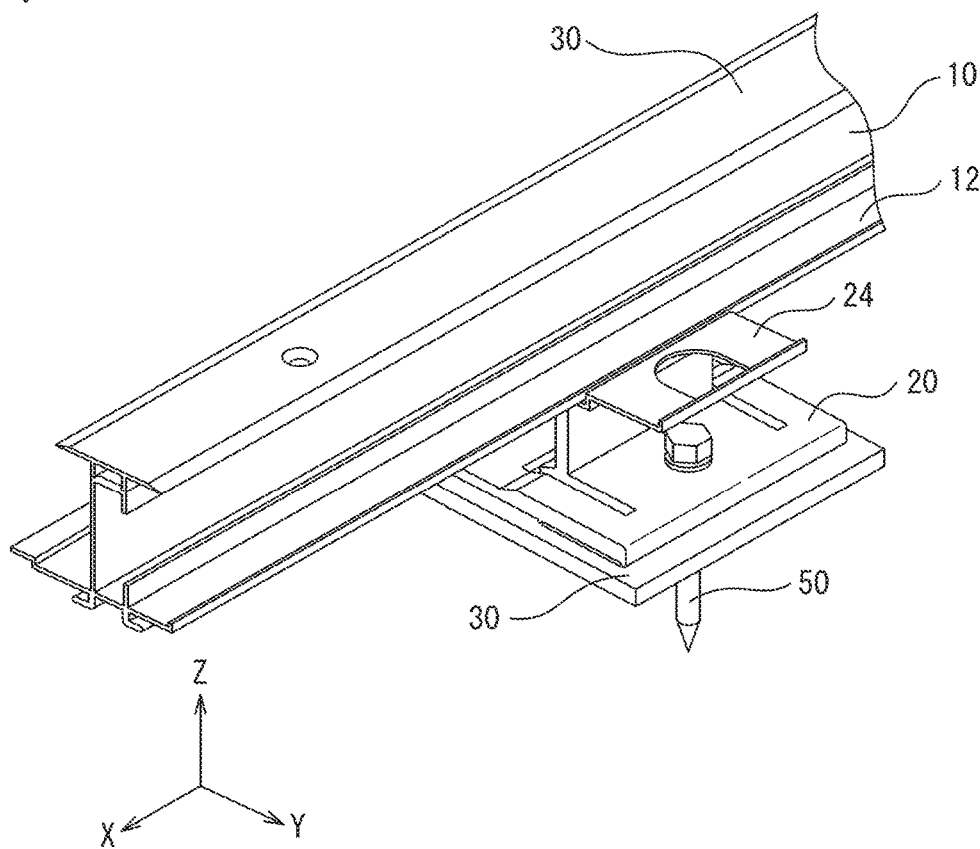
FIG. 7 is a perspective view showing a relationship between a retaining member and the beam member and the fixture of the solar cell module mounting device.

The module support part 24 of the fixture 20 has two ribs for reinforcement use projecting slightly upward, but overall extends in the Y-direction of the mounting device 1. The module support part 24 of the fixture 20, as shown by the perspective view of FIG. 7 showing the relationship between the beam member 10 and fixture 20, extends longer in the Y-direction than the first support part 12 of the beam member 10.

In this regard, when attaching the solar cell module 200 to the mounting device 1, the retaining member 30 is fastened in advance to the first beam member 10A which is first arranged. It is not possible to lower the solar cell module 200 downward from right above in the Z-direction. Therefore, the method is adopted of first inserting the first end part of the solar cell module 200 into the groove-shaped space formed between the retaining member 30 and the first support part 12 of the first beam member 10A from above at a slant, then lowering the second end part. At this time, since the module support part 24 of the fixture 20 extends longer in the Y-direction than the first support part 12 of the first beam member 10A, the first end part of the solar cell module 200 is first placed on the module support part 24 of the fixture 20 to set the position in the Z-direction, then is slid to make it move toward the first beam member 10A and is thereby supported by the first support part 12. In actual mounting work, a worker often cannot lift the first end part side of the solar cell module 200 and works holding just the second end part side away from the center of gravity position of the solar cell module 200, so the work efficiency is raised by the module support part 24 of the fixture 20 extending long in the Y-direction under the first end part side of the solar cell module 200. The dimension of the fixture 20 in the X-direction is relatively short, so even if extending the module support part 24 of the fixture 20 in the Y-direction in this way, it should be noted that the amount of increase of the material resulting from this is small.

The fixture 20 in the present embodiment is formed so as to block movement of the beam member 10 in the X-direction by changing in a standing angle of the second support column 23 and by the second support column 23 falling in toward the first support column 22 when the mounting base 21 is fastened to the building side by the fastening screw 50. For this reason, in the fixture 20, the mounting base 21 is provided with a deformable region formed at the inside of a slot 26. At the deformable region, the second support column is provided, and the fastening hole 25 is also formed. The slot 26, when viewed by FIG. 5B, is comprised of two upper and lower horizontal parts extending in the Y-direction and a single vertical part extending in the X-direction and connecting these two parts. The mounting base 21 contacts the installation surface by the two end line-shaped projections 21a at the two end parts, so a clearance is formed between the deformable region and the installation surface. Therefore, if fastening the mounting base 21 to the installation surface by fastening the fastening screw 50 passed through the fastening hole 25, the deformable region of the mounting base 21 at the inside of the slot 26 will rotate counterclockwise and bend downward when viewed by FIG. 5A. Therefore, the second support column 23 will also rotate counterclockwise and the second hook part 23a will displace downward slanted to the left in FIG. 5A whereby the inside surface of the first angle part 14 of the beam member 10 will be strongly pushed against. As a result, the beam member 10 is blocked from moving with respect to the fixture 20 in the X-direction.

The beam member 10 is blocked from movement with respect to the fixture 20 in the Y- and Z-directions by engagement of its first angle part 14 and the second hook part 23a of the fixture 20, and engagement of its second angle part 15 and the first hook part 22a of the fixture 20, so by the fixture 20 being fastened to the installation surface by the fastening screw 50, movement with respect to the fixture 20 in all of the X-, Y-, and Z-directions is blocked.

Note that, between the surroundings of the fastening hole 25 at the bottom surface of the mounting base 21 of the fixture 20 and the installation surface, a water seal 60 is arranged for providing a waterproof seal around the fastening screw 50. The water seal 60 is selected from easily compressible materials. In the present embodiment, a synthetic rubber EPDM foam material is used. For this reason, the water seal 60 will not obstruct the above-mentioned bending of the mounting base 21 of the fixture 20.

Figure 8:
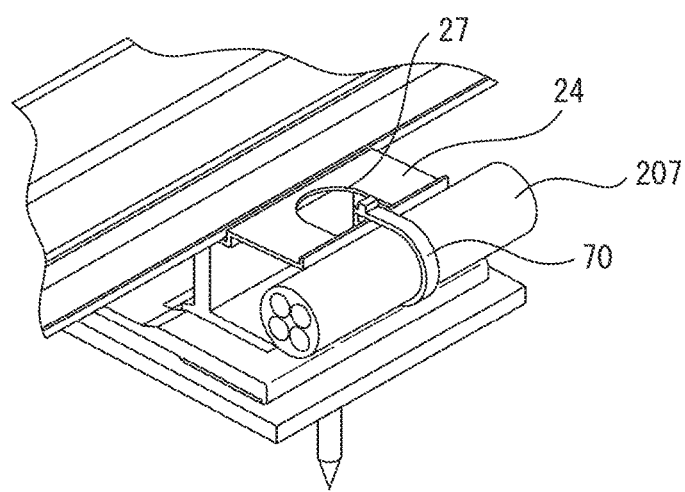
FIG. 8 is a perspective view showing the state in which an electrical cable is held by the fixture.

At the module support part 24 of the fixture 20, an opening 27 is formed enabling the insertion of a tool (not shown) for fastening the fastening screw 50. The opening 27, as shown in FIG. 5B, is shaped as a semicircle combined with a rectangle. This opening 27 can be utilized not only as a hole enabling insertion of a tool, but also, as shown in FIG. 1 and FIG. 8, as a hole for passage of a tie down member 70 for tying down an electrical cable 207 led out from the solar cell module 200 and holding it at the module support part 24 of the fixture 20.

The retaining member 30 according to the present embodiment is provided for restricting movement of the solar cell module 200 in the Z-direction. The retaining member 30, in the present embodiment, is formed from an extruded member made of an aluminum alloy and has a total length substantially equal to the length of the beam member 10 in the longitudinal direction. As shown in a three-way view in FIG. 9 showing an end part of the long retaining member 30, the cross-sectional shape of the retaining member 30 includes a thin rectangular main body part 31 having tapered parts at its left and right end parts, a plateau shaped thick part 32 sticking out from the bottom surface of the main body part 31, and two rib parts 33 sticking out from the bottom surface of the main body part 31 vertically to the same so as to sandwich the thick part 32 and extending in parallel with each other. The width of the main body part is a size larger than the width of the main body part of the beam member 10. The retaining member 30, in FIG. 9, has a plurality of holes 34 for fastening use, only two of which are shown. The plurality of holes 34 are used to screw the member into the top end face of the beam member 10. The side surfaces of the rib parts 33 are formed with pluralities of hole 35 for attachment of the later explained conductive metal fittings 80.

Figure 10B:
FIG. 10A shows a plan view and FIG. 10B shows a side view of a conductive metal fitting of the solar cell module mounting device.
Figure 10A:
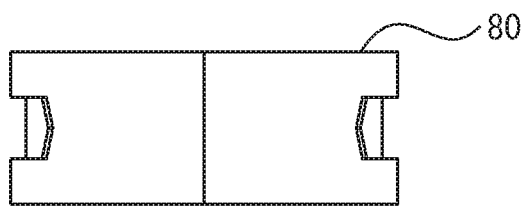

In the present embodiment, the retaining member 30 and the frame 202 of the solar cell module 200 are electrically connected by interposition of a plurality of conductive metal fittings 80 between the retaining member 30 and the beam member 10. The conductive metal fitting 80, as shown in FIGS. 10A-10B, is formed as a rectangular shaped sheet piece having a length substantially equal to the width of the retaining member 30 and has tab parts 81 sticking out from the two end parts of its bottom surface. The tab parts 81 are designed so that conduction is obtained by contact with the surface of the frame 202 of the solar cell module 200 which is usually treated to form an oxide film.

Figure 11:
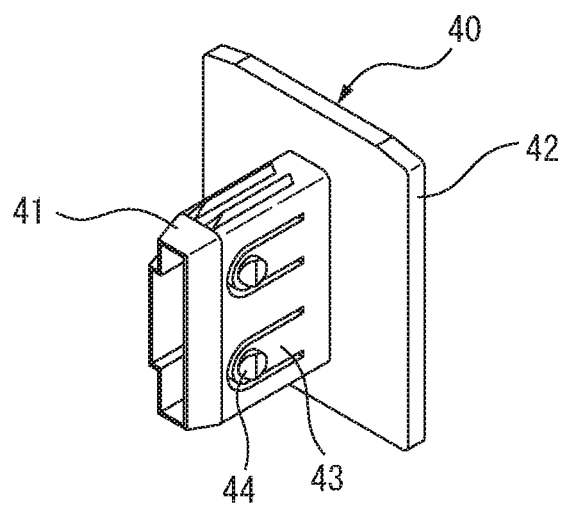
FIG. 11 is a perspective view of an end cap of the solar cell module mounting device.

The mounting device 1 of the present embodiment is provided with a plurality of end caps 40. The end caps 40 block movement of the solar cell module 200 with respect to the beam members 10 in the X-direction and are attached to the end parts of the beam members 10 in the longitudinal direction. Each end cap 40, as shown in FIG. 11, has a substantially rectangular shaped main body part 41 able to fit into the inside of the main body part 11 of the beam member 10 and a rectangular flange part 42 provided at the first end part of the main body part 41. The side surface of the main body part 41 has two tongue pieces 43 able to elastically deform and two projections 44 formed at the end parts of the same. The end parts of the beam member 10 in the longitudinal direction are provided with two holes (not shown) with which the two projections 44 of the end caps 40 can engage. Therefore, by inserting the main body parts 41 of the end caps 40 into the main body part 11 of the beam member 10, the two projections 44 fit into the two holes of the beam member 10 whereby the end caps 40 are engaged with the beam member 10. The flange parts 42 of the end caps 40 engaged with the beam member 10 in this way block movement of the solar cell module 200 in the X-direction.

The end caps 40 not only have the effect of blocking abnormal movement of the solar cell module 200 in the X-direction, but also the effect of preventing entry of dirt and other foreign matter inside the main body parts 11 of the beam members 10 and the prevention of injury to the installers and improvement of aesthetic appearance of the mounting device 1.

Next, one example of the general procedure for using the mounting device 1 according to the present embodiment to mount solar cell modules 200 on the installation surface of the roof of a house will be explained.

First, the first beam member 10A arranged closest to the eaves of the roof is fastened to the installation surface. At this beam member 10A, a plurality of fixtures 20 are attached in advance by inserting first hook parts 22a and second hook parts 23a of fixtures 20 in the grooves formed between the first and second angle parts 14, 15 and the first and second support parts 12, 13, respectively. End caps 40 are also attached to the two end parts of the first beam member 10A in the longitudinal direction. Furthermore, the first beam member 10A has the retaining member 30 on which the conductive metal fittings 80 are attached fastened to it in advance.

The thus prepared first beam member 10A is fastened arranged on the roof member 300 along the direction of extension of the eaves. The fixtures 20 usually have to be fastened by the fastening screws 50 at the rafters (not shown) of houses provided under the roof members 300. In the present embodiment, the fixtures 20 can be slid with respect to the first beam member 10A in the X-direction to match them in position with the rafters. In the present embodiment, by fastening the fixtures 20 by the fastening screws 50, as explained above, movement of the first beam member 10A with respect to the fixtures 20 in the X-direction is blocked.

Next, the second beam member 10B to be placed in the middle is prepared. The second beam member 10B also has a plurality of fixtures 20 and two end caps 40 attached to it in advance, but the retaining member 30 and conductive metal fittings 80 are not attached at this stage. The prepared second beam member 10B is arranged in parallel with the first beam member 10A a predetermined interval away from the first beam member 10A. However, at this stage, the fixtures 20 are not screwed into the installation surface.

Next, the first end part of the first solar cell module 200 is inserted into the space between the first support part 12 of the first beam member 10A and the retaining member 30 so that the first end part of the first solar cell module 200 arranged at the first row is supported by the first support part 12 of the first beam member 10A and the second end part is supported by the second support part 13 of the second beam member 10B, then the second end part is lowered. At this time, it is possible to place the first end part of the solar cell module 200 on the module support part 24 of the fixture 20 then slide it to the eave side so as to shorten the work time.

Next, the second solar cell module 200 arranged adjoining the first solar cell module 200 in the X-direction is supported by the first beam member 10A and second beam member 10B in the same way as the first solar cell module 200. The solar cell modules 200 are electrically connected as required.

Next, the first and second solar cell modules 200 are pushed against the first beam member 10A through the second beam member 10B to set their positions, then the fixtures 20 attached to the second beam member 10B are fastened to the installation surface by the fastening screws 50. At this time, the position of the second beam member 10B in the Y-direction and the parallelness with the first beam member 10A are naturally determined well based on the solar cell module 200 having relatively good dimensional precision and precision of parallelness of the facing sides. Even when the position and parallelness of the second beam member 10B have to be adjusted, the solar cell module 200 of the second row adjoining it in the Y-direction is still not placed, so such parallelness can be simply adjusted. The work of fastening the fixtures 20 by the fastening screws 50 can also be simply performed.

Next, the retaining member 30 and conductive metal fittings 80 are fastened to the second beam member 10B.

Next, the third beam member 10C close to the ridge is prepared in the same way as the second beam member 10B and placed on the roof. A third solar cell module 200 of the second row adjoining the first solar cell module 200 in the Y-direction is placed in the space between the second beam member 10B and third beam member 10C by a procedure similar to the first solar cell module explained above and is supported by the second beam member 10B and third beam member 10C.

Next, a fourth solar cell module 200 of the second row adjoining the third solar cell module 200 in the X-direction is placed in the space between the second beam member 10B and third beam member 10C and is supported by the second beam member 10B and third beam member 10C. The solar cell modules 200 are electrically connected as necessary.

Next, the third and fourth solar cell modules 200 are pushed against the second beam member 10B through the third beam member 10C to set their positions, then the fixtures 20 attached to the third beam member 10C are fastened to the installation surface by the fastening screws 50.

Finally, the retaining member 30 and conductive metal fittings 80 are fastened to the third beam member 10C to thereby complete the mounting.

Figure 12:
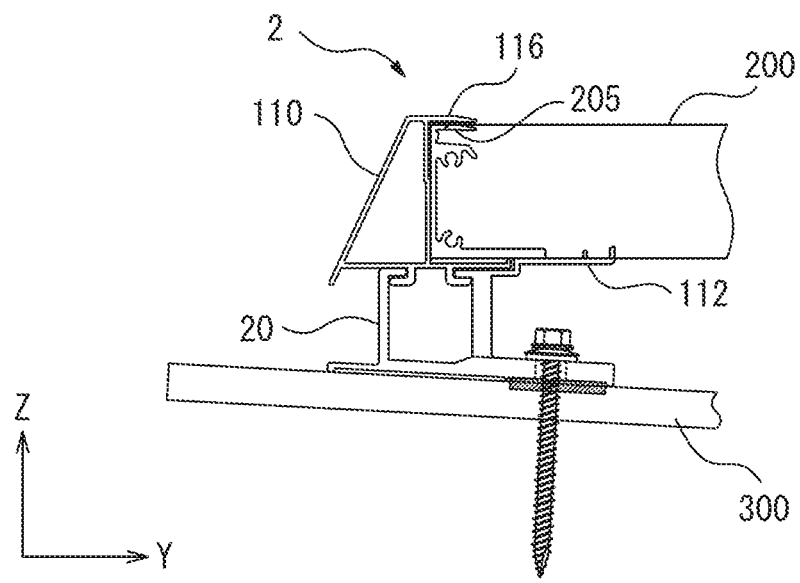
FIG. 12 is a partial cross-sectional view of a solar cell module mounting device according to a second embodiment.

Next, a mounting device of a second embodiment according to the present invention will be explained below. The mounting device 2 of the second embodiment, as shown in FIG. 12, differs from the mounting device 1 of the first embodiment explained above on the point that a beam member 110 arranged close to the eaves among the three beam members has a first support part 112, but does not have a second support part, the point that the beam member 110 has a retaining part 116 restricting movement of the solar cell module 200 in the Z-direction, etc. In this Description, such a beam member not having a second support part and suited for placement close to the eaves will be referred to as an "exclusively single end support use beam member 110". The exclusively single end support use beam member 110 of the mounting device 2, while not shown, has a second conductive metal fitting attached in place of the above-mentioned conductive metal fitting 80 between the retaining part 116 and the retaining part 205 of the frame of the solar cell module.

Figure 13:
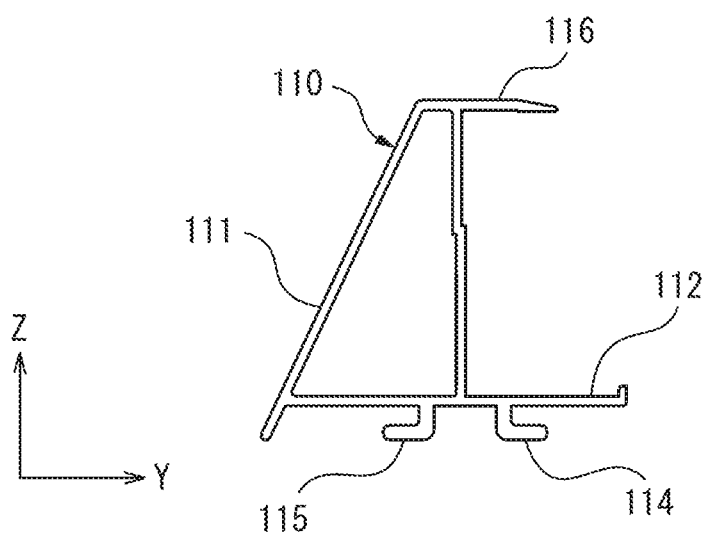
FIG. 13 is a cross-sectional view of an exclusively single end support use beam member of the solar cell module mounting device according to the second embodiment.

The exclusively single end support use beam member 110, in the present embodiment, is formed as an extruded member made of an aluminum alloy. Its transverse cross-sectional shape, as shown in FIG. 13, includes a substantially right triangle shaped main body part 111, a first support part 112 sticking out from the bottom part of the main body part 111 horizontally to the right side in the figure, a first angle part 114 and second angle part 115 extending downward from the bottom parts of the first support part 112 and the main body part 111, respectively, and a retaining part 116 extending from the top part of the main body part 111 in the Y-direction.

By using such an exclusively single end support use beam member 110, it is possible to improve the beautiful appearance of the eave side of the mounting device 2 and possible to reduce the number of the retaining members 30 by one and cut the work of screwing it into the beam member.

Figure 14:
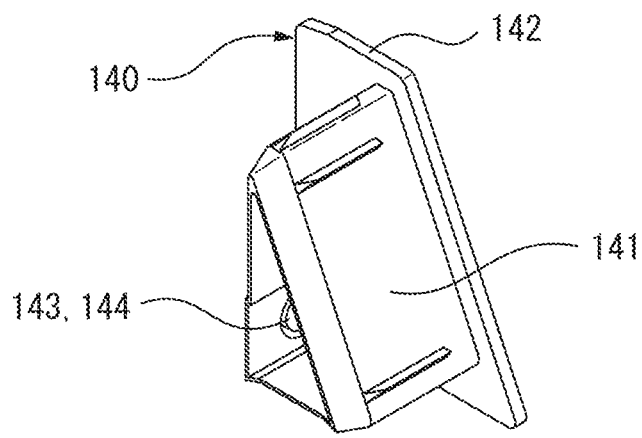
FIG. 14 is a perspective view of an end cap for the exclusively single end support use beam member.

The mounting device 2 of the second embodiment also comprises end caps 140 able to fit with the above-mentioned exclusively single end support use beam member 110. The end cap 140 shown in FIG. 14 has a substantially right triangle prism shaped main body part 141 able to engage with the inside of the hollow substantially right triangle column shaped main body part 111 of the exclusively single end support use beam member 110 and a plateau shaped flange part 142 provided at the first end part of the main body part 141. The side surface of the main body part 141, like the end cap 40 in the first embodiment, has two elastically deformable tongue pieces 143, of which only one is partially shown in FIG. 14, and two projections 144 formed at the ends of the tongue pieces 143.

Next, a mounting device of a third embodiment will be explained below. The mounting device of the third embodiment comprises pluralities of beam members 10 to be arranged at the end parts of the solar cell modules 200 and exclusively single end support use beam members 110. This differs from the mounting device of the second embodiment in the point that the plurality of beam members are connected by at least one joint member 120 or 130. In the third embodiment, the beam members 10 and exclusively single end support use beam members 110 have lengths of one solar cell module extents. Therefore, the plurality of beam members are connected by the joint member 120 or 130 in accordance with the number of solar cell modules 200 arranged aligned.

Figure 15:
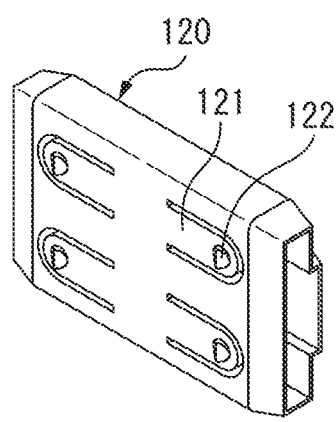
FIG. 15 is a perspective view of a joint for beam members.

The joint member 120 for beam member 10 use, as shown in FIG. 15, is formed as a hollow substantially parallelepiped shape able to fit inside of the main body parts 11 of beam members 10 and has four elastically deformable tongue pieces 121 and four projections 122 formed at the end parts of the tongue pieces 121. At the end parts of each of the beam members 10 in the longitudinal direction, two holes (not shown) are provided, with which the two projections 122 of one side of the joint member 120 can fit. Therefore, by inserting the joint member 120 to the main body parts 11 of two beam members 10 to be connected, the four projections 122 engage with the total four holes of the two beam members 10, so the two beam members 10 are connected through the joint member 120. In the present embodiment, the two holes at an end part of the beam member 10 are the same as the two holes provided for engagement with an end cap 40 explained above.

Figure 16:
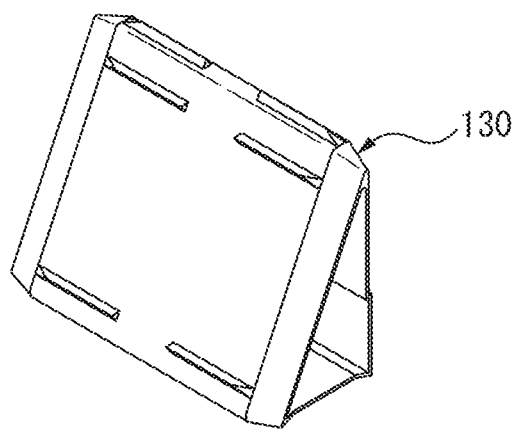
FIG. 16 is a perspective view of a joint for the exclusively single end support use beam member.

The joint member 130 for exclusively single end support use beam member 110 use, as shown in FIG. 16, is formed as a hollow substantially right angle triangle prism shape able to be fit inside of the hollow substantially right angle triangle prism shaped main body parts 111 of exclusively single end support use beam members 110 so as to enable the adjoining end parts of two exclusively single end support use beam members 110 to be connected.

When installing the mounting device of the third embodiment, preferably before the second beam members 10B are connected by the joint member 120, the retaining member 30 and conductive metal fittings 80 are attached to the second beam member 10B, then the member is fit with the solar cell module 200 and, finally, is connected with the adjoining second beam member 10B by the joint member 120.

Next, a mounting device 4 of a fourth embodiment will be explained below with reference to FIGS. 17 to 23. The mounting device 4 of the fourth embodiment, while not shown in overall configuration, comprises three beam members 410 and twelve fixtures 420 for supporting four solar cell modules 200 in the same way as the mounting device 1 of the first embodiment shown in overall configuration in FIG. 2 and FIG. 3.

Figure 17:
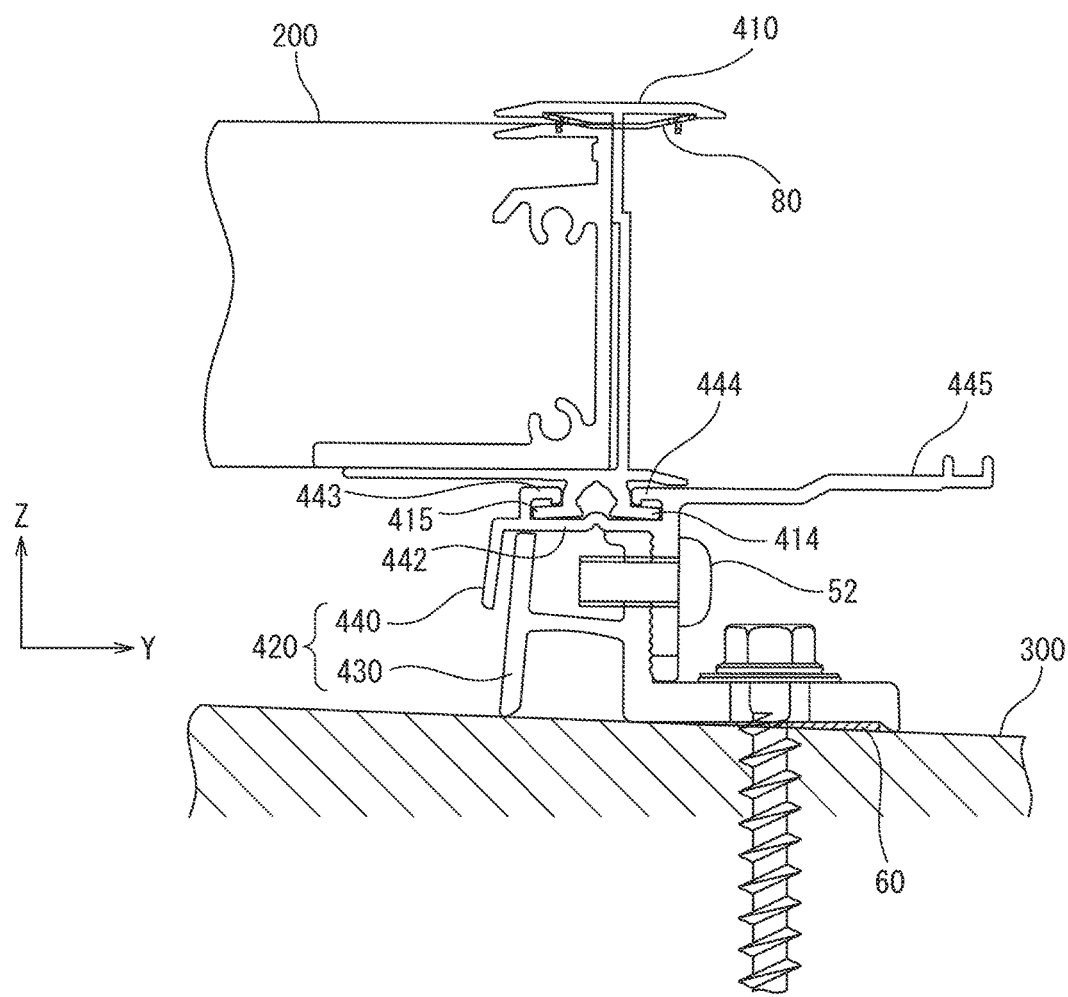
FIG. 17 is a cross-sectional view of a part of a solar cell module mounting device according to a fourth embodiment.
Figure 18:
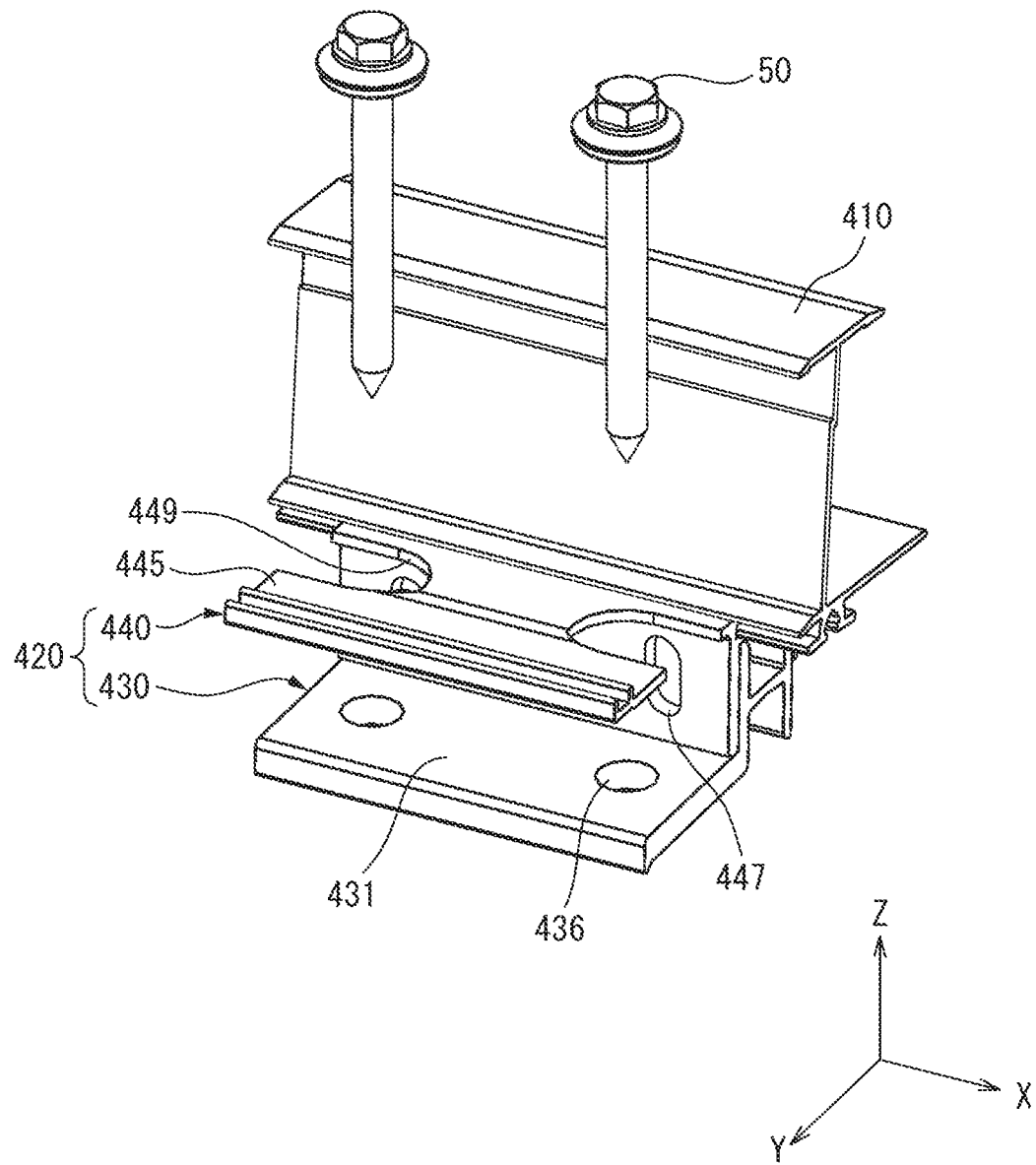
FIG. 18 is a perspective view of a part of the solar cell module mounting device according to the fourth embodiment.

FIG. 17 is a cross-sectional view of a part of the mounting device 4 at which a solar cell module 200 is attached. In FIG. 17, the beam member 410 closest to the ridge, the fixture 420, the solar cell module 200 supported by the second support part of the beam member 410 (second support part), the conductive metal fittings 80, the roofing member 300 providing the installation surface, etc. are shown. FIG. 18 is a perspective view showing the state of assembling the beam member 410 and the fixture 420. Note that the length of the beam member 410 is usually a length of at least a long side of a rectangular solar cell module 200. Therefore, in FIG. 18, the beam member 410 is shown in a state cut shorter than the actual state.

Figure 19:
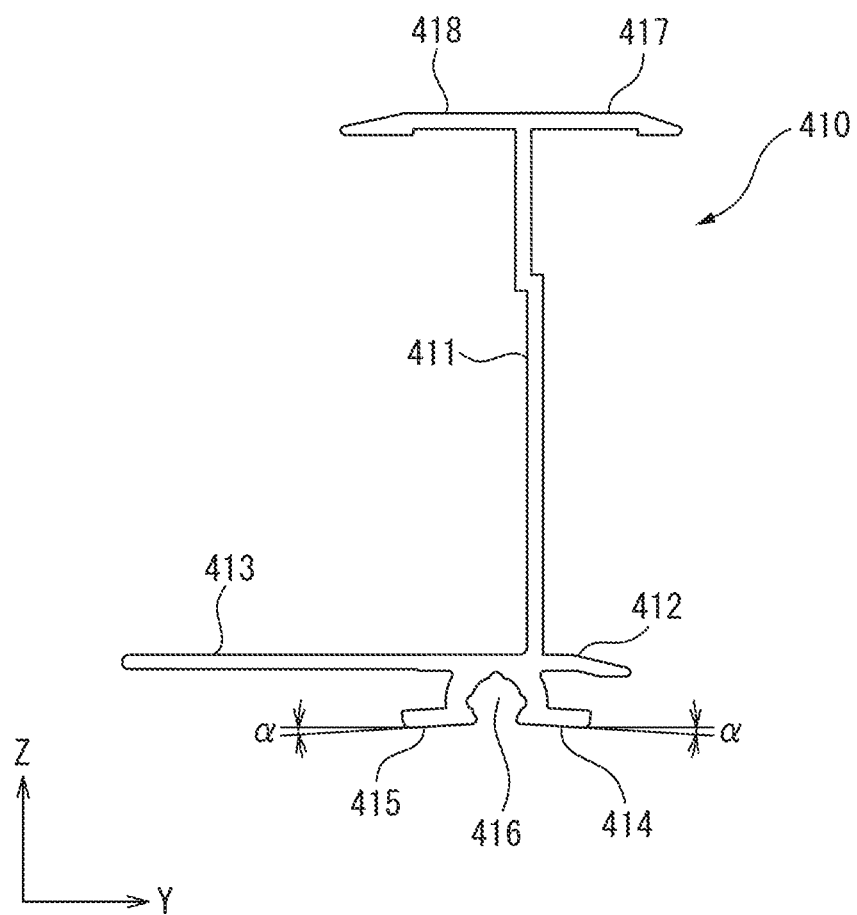
FIG. 19 is a side view of a beam member of the solar cell module mounting device according to the fourth embodiment.

First, the beam member 410 of the mounting device 4 of the fourth embodiment will be explained while referring to its single cross-sectional view of FIG. 19. This beam member 410, in the present embodiment, is formed as an extruded member made of an aluminum alloy. Its transverse cross-sectional shape includes a wall part 411 having a slight step difference in the middle, but extending generally vertically, a first support part 412 sticking out from the bottom part of the wall part 411 horizontally to the right side in the figure, a second support part 413 sticking out to the left, a first angle part 414 extending downward from the substantially bottom side of the wall part, and a second angle part 415 arranged next to the first angle part 414 at the left and extending downward. The bottom surfaces of the first angle part 414 and second angle part 415 are not parallel in the Y-direction of FIG. 19 and cross the horizontal by a crossing angle α. Due to the first angle part 414 and the second angle part 415, a downward opening space 416 is formed. The beam member 410 has a first retaining part 417 extending horizontally from the top end of the wall part 411 to the right in the figure and a second retaining part 418 extending horizontally to the left in the figure. The first and second retaining parts 417 and 418 have similar functions to the retaining member 30 in the first embodiment.

The beam member 410 not only restricts movement of the solar cell module 200 in the Z-direction by its first support part 412, second support part 413, first retaining part 417, and second retaining part 418, but also restricts movement of the solar cell module 200 in the Y-direction by its wall part 411.

The later explained second hook part 444 and first hook part 443 of an upper member 440 of the fixture 420 respectively engage with the grooves formed between the first angle part 414 and first support part 12 and between the second angle part 415 and second support part 413 of the beam member. As a result, movement of the beam member 410 with respect to the fixture 420 in the Y- and Z-directions is blocked.

Figure 20:
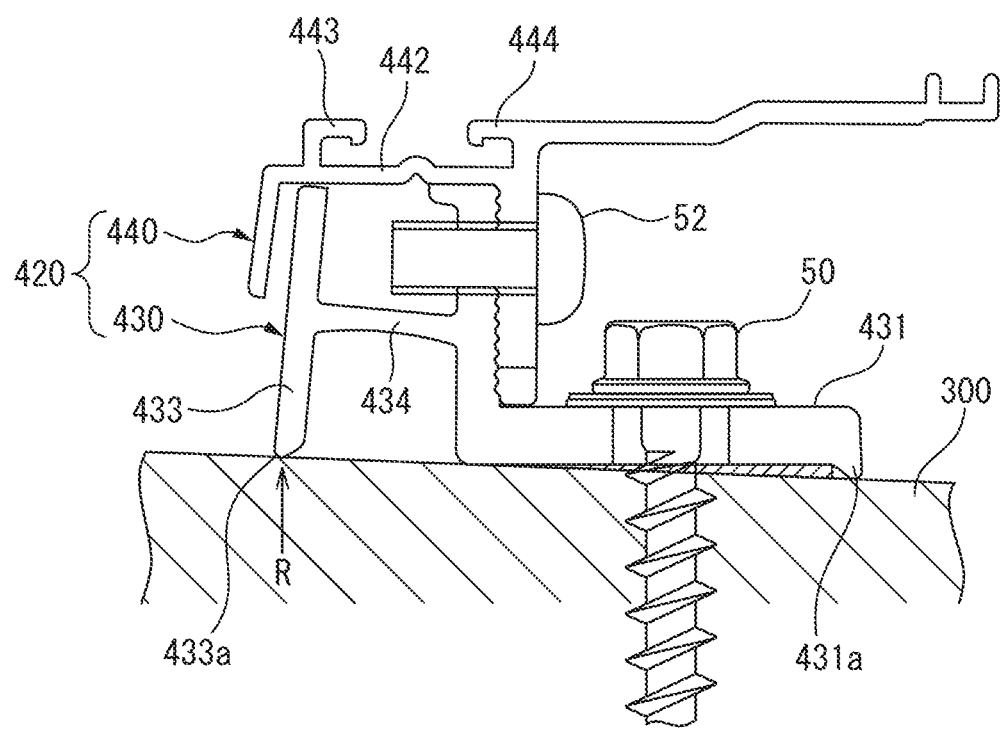
FIG. 20 is a cross-sectional view of a fixture of the solar cell module mounting device according to the fourth embodiment.

FIG. 20 is a cross-sectional view showing the state of placing the fixture 420 on the installation surface of a roofing member 300 and fastening it by a fastening screw 50. The fixture 420 is comprised of a lower member 430 and an upper member 440. The lower member 430 and the upper member 440 are assembled as shown in FIG. 20 and joined by joining screws 52.

Figure 21:
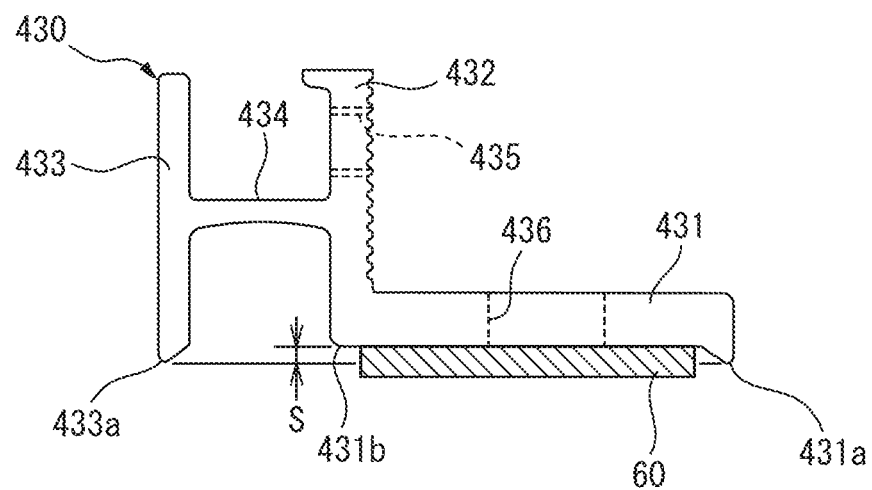
FIG. 21 is a side view of a lower member of the fixture in FIG. 20.

The lower member 430, as shown in its side view of FIG. 21, has a mounting base 431 to be fastened to the installation surface, a first support column 432 provided extending above from the mounting base 431, that is, in the Z-direction of the mounting device 4, a second support column 433 extending substantially in parallel with the first support column 432, and a connecting part 434 extending horizontally for connecting the first support column 432 and the second support column 433 at substantially the center part. The mounting base 431 is arranged at the side of the beam member 410 with the first support part 412 when the fixture 420 and the beam member 410 are assembled.

At the right side surface of the first support column 432 of the lower member in FIG. 21, fine relief shapes are provided. The fine relief shapes of the first support column 432 engage with similar fine relief shapes of the upper member 440 thereby enabling force acting on the upper member 440 from above to be supported. The first support column 432 is provided with screw holes 435, at two locations in the present embodiment, for screwing in joining screws 52. The mounting base 431 is provided with fastening holes 436, at two locations in the present embodiment, for passing the fastening screws 50. At the bottom surface of the mounting base 431 around the fastening holes 436, water seals 60 are provided in the same way as the case of the first embodiment.

The end part of the mounting base 431 at the right side of the figure has a projecting part 431a projecting downward from the bottom surface. On the other hand, the bottom end part 433a of the second support column 433 sticks out downward from the bottom surface by exactly the interval S when placing the bottom surface of the mounting base 431 horizontal as shown in FIG. 21. This is substantially the same level as the projecting part 431a of the mounting base 431.

Figure 22:
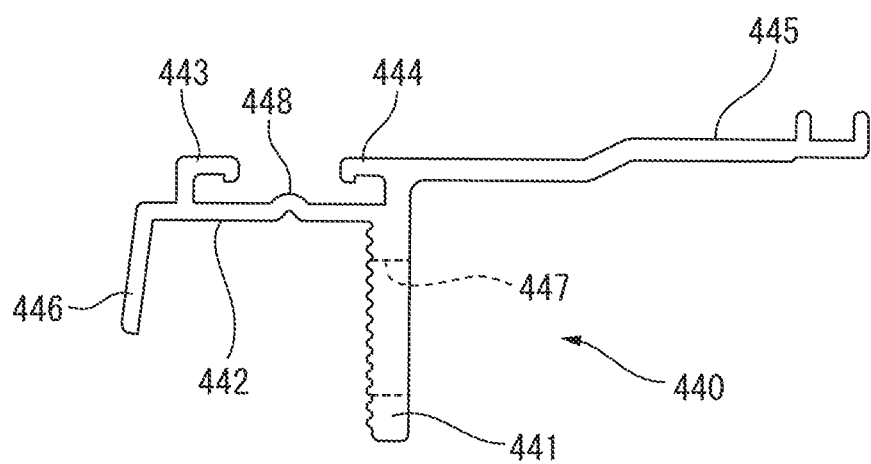
FIG. 22 is a side view of an upper member of the fixture in FIG. 20.

The upper member 440, as shown by its side view of FIG. 22, has a connecting part 441 extending substantially vertically, a beam support part 442 extending from the top end of the connecting part 441 to the left in the figure substantially horizontally, a first hook part 443 arranged at the upper side close to the left end part of the beam support part 442, a second hook part 444 arranged facing the first hook part in the horizontal direction, a module support part 445 extending to the right of the second hook part 444 in the figure substantially horizontally, and a reinforcing part 446 extending from the left end part of the beam support part 442 substantially downward. At the substantial center of the beam support part 442, an upward projecting part 448 is provided.

The beam support part 442 of the upper member 440, as shown in FIG. 17, supports the first and second angle parts 414, 415 of the beam member, while the first and second hook parts 443, 444 of the upper member restrict movement of the first and second angle parts 414, 415 of the beam member upward in the Z-direction. The module support part 445 of the upper member is shaped similarly to and acts similarly with the module support part 24 of the fixture 20 of the first embodiment. The module support part 445 is provided with openings 449 enabling the insertion of a tool (not shown) for fastening the fastening screws 50 (see FIG. 18).

Figure 24:
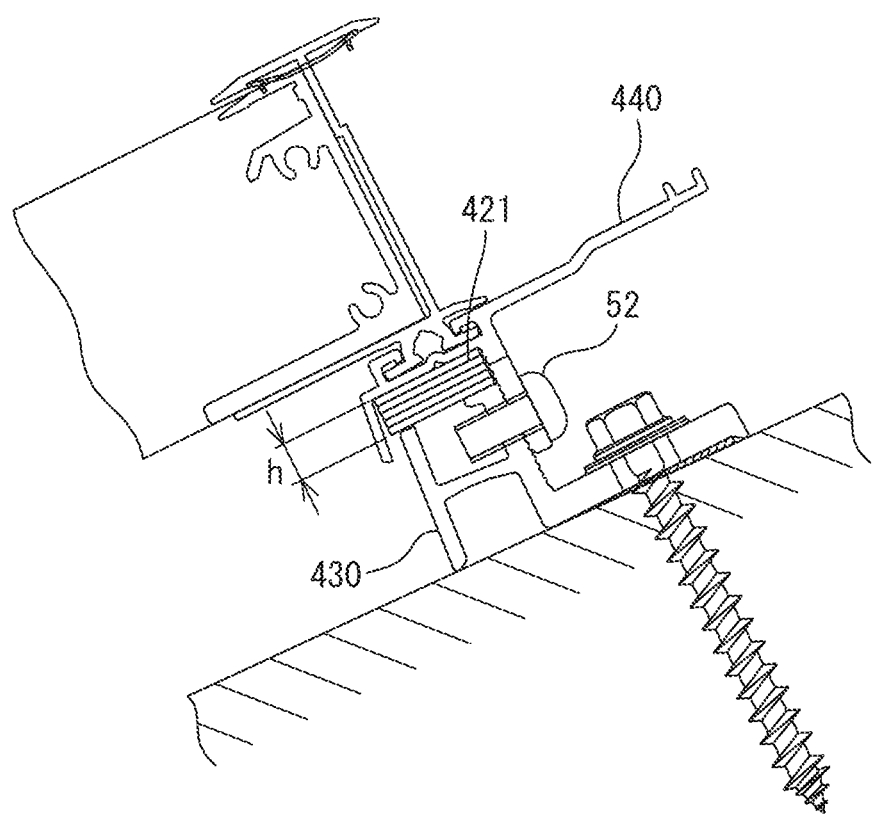
FIG. 24 is a cross-sectional view of a part of the solar cell module mounting device according to the fourth embodiment.

At the left side surface of the connecting member 441 of the upper member in FIG. 22, fine relief shapes are formed able to engage with similar fine relief shapes provided at the first support column 432. The connecting member 441 is provided at two locations with elongated holes 447 long in the Z-direction for the joining screws 52. The elongated holes 447 are provided for adjustment of the position of the upper member 440 in the Z-direction with respect to the lower member 430. In FIG. 17 and FIG. 20, the upper member 440 is positioned at the lowest location. Therefore, the top ends of the first and second support columns 432, 433 of the lower member contact the bottom surface of the beam support part 442 of the upper member. If raising the position of the upper member 440, as shown in FIG. 24, one or more thin shim plates 421 are inserted between the top ends of the first and second support columns 432, 433 of the lower member and the bottom surface of the beam support part 442 of the upper member to prevent a clearance from forming. In FIG. 24, a height adjustment amount "h" of the upper member 440 is shown, and five shim plates 421 are utilized.

In the present embodiment, the beam member 410 is supported at its first and second angle parts 414, 415 by the beam support part 442 of the upper member 440 of the fixture 420 and, further, is blocked from movement upward by the first and second hook parts 443, 444 of the upper member. In the present embodiment, the beam member 410 is further blocked from movement in the X-direction if the fixture 420 is fastened to the installation surface by the fastening screws 50. This will be explained in more detail below.

If placing the mounting base 431 of the lower member 430 of the fixture 420 on an installation surface and fastening it there by the fastening screws 50, due to the effect of the interval S, an upward reaction force R acts from the installation surface on the bottom end part 433a of the second support column 433 (see FIGS. 20 and 21). At this time, the connecting part 434 has a certain extent of length in the Y-direction so as to be able to bend and, as a result, the second support column 433 displaces upward. The top end of the second support column 433 contacts the bottom surface of the beam support part 442 of the upper member, so due to the upward displacement of the second support column 433, the beam support part 442 displaces by bending upward.

If the beam support part 442 of the upper member displaces by bending upward, the upper member 440 grips the first angle part 414 of the beam member 410 between the beam support part 442 and the second hook part 444. Furthermore, if the beam support part 442 of the upper member displaces by bending upward, the tip of the first hook part 443 of the upper member also displaces to the right in the FIG. 20, so the upper member 440 grips the first and second angle parts 414, 415 of the beam member between the first hook part 443 and second hook part 444. As a result, if the beam member 410 is fastened by the fastening screws 50 so as to fasten the lower member 430 of the fixture to the installation surface, movement in the X-direction with respect to the fixture 420 is obstructed.

Next, one example of the procedure for using the mounting device 4 according to the fourth embodiment to mount the solar cell modules 200 on the installation surface of the roof member 300 will be explained below with reference to FIGS. 23A-23C focusing on points different from the first embodiment. Note that the three beam members 410 of the mounting device 4 used are the same in the present embodiment, but are called by different names in accordance with the places they are placed, that is, from the side closest to the eaves, the "first", "second", and "third" beam members 410. When the three do not have to be differentiated in the explanation, they will be called the "beam member 410".

Figure 23C:
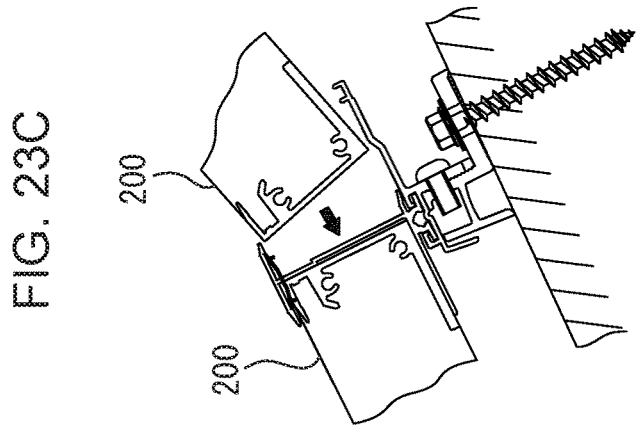
FIGS. 23A-23C are views showing one example of a procedure for mounting solar cell modules using the solar cell module mounting device according to the fourth embodiment.
Figure 23B:
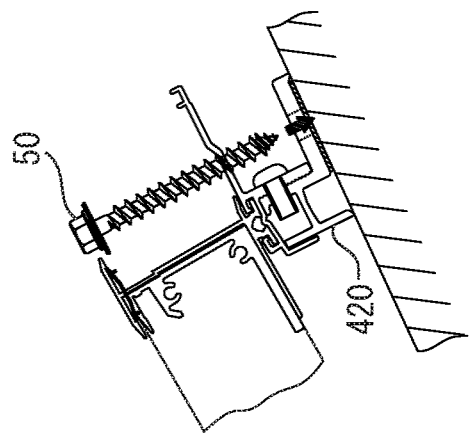
Figure 23A:
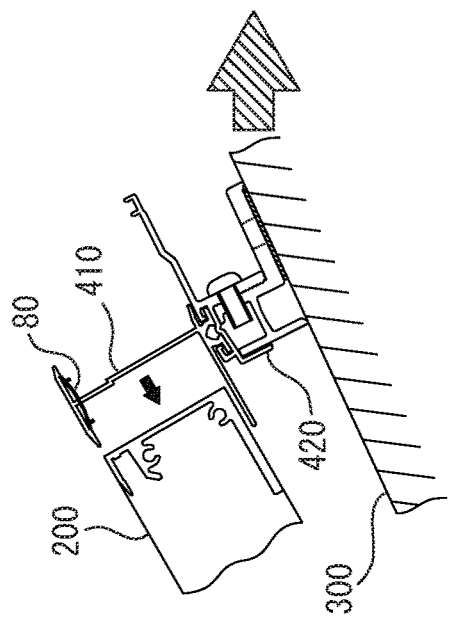

FIGS. 23A-23C are side views showing the second beam member 410 and the fixture 420 supporting the same.

First, the first beam member 410 arranged closest to the eaves of the roof (not shown) is mounted to the installation surface in the same way as the case of the above-mentioned first embodiment. The first beam member 410 has a plurality of fixtures 420 and conductive metal fittings 80 attached to it in advance. In the fourth embodiment, the retaining member 30 is not used.

Next, a second beam member 410 to be placed in the middle is prepared. The second beam member 410 also has a plurality of fixtures 420 and conductive metal fittings 80 attached to it in advance. The prepared second beam member 410 is placed in parallel with the first beam member 410 separated from it by a predetermined interval. The predetermined interval in the fourth embodiment is slightly longer than the predetermined interval in the first embodiment since the beam member 410 has the second retaining part 418.

Next, the first end part of the first solar cell module 200 arranged in the first row is inserted into the space between the first support part 412 of the first beam member (not shown) and the first retaining part 417 (not shown), then the second end part is lowered and placed on the second support part 413 of the second beam member (see FIG. 23A). Next, the second solar cell module 200 arranged adjoining the first solar cell module 200 in the X-direction (not shown) is supported by the first beam member 410 and second beam member 410 in the same way as the first solar cell module 200.

Next, the first and second solar cell modules 200 are pushed against the first beam member 410 through the second beam member 410 to set their positions, then the fixtures 420 attached to the second beam member 410 are fastened by the fastening screws 50 to the installation surface (see FIG. 23B).

At this time, if necessary to adjust the height of the beam member, as shown in FIG. 24, the required number of shim plates 421 may be inserted between the lower member 430 and the upper member 440 of a fixture and then the lower member 430 and upper member 440 may be fastened by the joining screws 52.

Similarly, a third beam member 410 (not shown) close to the ridge is prepared and placed on the roof. The third solar cell module 200 and fourth solar cell module 200 (not shown) are inserted between the first support part 412 and first retaining part 417 of the second beam member 410 (see FIG. 23C), then the second end parts are lowered and made to be supported by the third beam member 410. Next, the fixtures 420 (not shown) attached to the third beam member 410 are fastened to the installation surface.

Other Embodiments

The mounting devices of the above-mentioned embodiments are provided with three beam members, but in the present invention, an embodiment of a mounting device with just one beam member is also possible. In that case, one end part of one solar cell module 200 is supported by a single beam member while fastened to the installation surface through fixtures. The remaining end part of the solar cell module 200 may be supported and fastened on the installation surface by any known means.

The mounting devices of the above-mentioned embodiments are explained as being installed on the sloping roofs of houses, but the mounting device according to the present invention may also be installed on a nonsloping rooftop of a building. In that case, if desiring to make the light receiving surfaces of the solar cell modules 200 sloping, it is sufficient to interpose spacers below the fixtures so as to change the heights of the fixtures, prepare fixtures with different heights of support columns, or make other changes.

In the mounting devices 1, 2, and 4 of the embodiments, the solar cell modules are arranged so that the vertical end edges of the rectangular shaped solar cell modules 200 extending in the sloping direction of the roof are connected with the vertical end edges of the adjoining solar cell modules 200, but an embodiment of the mounting device where the solar cell modules are arranged in a zigzag manner is also possible.

In the present invention, the first to the fourth embodiments can be suitably combined so long as not technically contradicting each other. For example, an embodiment in which the mounting fixtures 420 of the mounting device 4 of the fourth embodiment are applied instead of the fixtures 20 in the mounting device 1 of the first embodiment is also possible. An embodiment in which the beam member 10 of the mounting device 1 of the first embodiment is applied instead of the beam member 410 in the mounting device 4 of the fourth embodiment is also possible.

This application claims priority based on Japanese Patent Application No. 2015-093629 filed on Apr. 30, 2015 and incorporates by inclusion the entire content of Japanese Patent Application No. 2015-093629.

The invention claimed is:

1. A solar cell module mounting device for mounting a solar cell module having a first end part and a second end part extending in parallel with each other onto an installation surface, the device comprising:
    a beam member having a first support part for supporting the first end part of the solar cell module and a second support part for supporting a second end part of another solar cell module arranged adjoining the solar cell module; and
    a fixture supporting the beam member and configured to be fastened by fastening means to the installation surface on a side of the beam member where the first support part, not the second support part, is provided,
wherein
    the fixture has a mounting base configured to be fastened by the fastening means to the installation surface, and
    the fixture is configured to grip the beam member by deforming a part of the fixture when the mounting base is fastened by the fastening means to the installation surface.

2. The solar cell module mounting device according to claim 1, wherein
    the fixture further has a first support column and second support column provided rising from the mounting base, and
    the fixture has a deformable region defined by a slot at the mounting base so that when the mounting base is fastened by the fastening means to the installation surface, a standing angle of the second support column changes and the first and second support columns grip the beam member.

3. The solar cell module mounting device according to claim 1, further comprising a retaining member which is detachably attached to the beam member and configured to obstruct movement of the solar cell module in an upper surface direction when a light receiving surface of the solar cell module is referred to as an upper surface.

4. The solar cell module mounting device according to claim 1, further comprising a cap attached to an end of the beam member in a longitudinal direction of the beam member so as to block movement of the solar cell module with respect to the beam member in the longitudinal direction of the beam member.

5. The solar cell module mounting device according to claim 1, further comprising a joint member for beam members, wherein the beam members are connected to each other in a longitudinal direction thereof by the joint member.

6. The solar cell module mounting device according to claim 1, further comprising at least one beam member same as the beam member, wherein
the at least one beam member and the beam member constitute N+1 number of beam members configured to arrange at least one solar cell module on each of N number of arrangement axes arranged at intervals in parallel with a longitudinal direction of the N+1 number of the beam members.

7. The solar cell module mounting device according to claim 6, wherein one of the N+1 number of the beam members is replaced with an exclusive beam member having a first support part for first end part supporting use, but not having a second support part.

8. The solar cell module mounting device according to claim 1, wherein
the fixture has a module support part configured to support the first end part of the solar cell module, and
the module support part extends longer than the first support part of the beam member in a direction perpendicular to a normal direction of a light receiving surface of the solar cell module and a longitudinal direction of the beam member.

9. The solar cell module mounting device according to claim 8, wherein
the module support part of the fixture has an opening, and
the module support part of the fixture is configured to hold an electrical cable led out from the solar cell module by a tie down member passing through the opening.

10. The solar cell module mounting device according to claim 1, wherein
the fixture comprises a lower member and an upper member,
the lower member has
the mounting base,
a first support column rising from the mounting base,
a second support column extending parallel to the first support column, and
a connecting part connecting the first and second support columns,
the upper member has
a beam support part supporting the beam member, and hook parts, and
when the mounting base is fastened by the fastening means to the installation surface, the second support column displaces upon receiving a reaction force from the installation surface, and displacement of the second support column of the lower member causes the hook parts and the beam support part to grip the beam member.

11. The solar cell module mounting device according to claim 10, wherein the fixture is configured such that a position of the upper member with respect to the lower member in a direction perpendicular to a light receiving surface of the solar cell module is adjustable.

12. The solar cell module mounting device according to claim 10, wherein
the upper member further has a module support part configured to support the first end part of the solar cell module, and
the module support part extends longer than the first support part of the beam member in a direction perpendicular to a normal direction of a light receiving surface of the solar cell module and a longitudinal direction of the beam member.

13. The solar cell module mounting device according to claim 12, wherein the module support part is provided with at least one opening.

14. The solar cell module mounting device according to claim 10, further comprising at least one beam member same as the beam member,
wherein the at least one beam member and the beam member constitute N+1 number of beam members configured to arrange at least one solar cell module on each of N number of arrangement axes arranged at intervals in parallel with a longitudinal direction of the N+1 number of the beam members.

15. The solar cell module mounting device according to claim 14, wherein one of the N+1 number of the beam members is replaced with an exclusive beam member having a first support part for first end part supporting use, but not having a second support part.

16. A solar cell module system, comprising:
a plurality of solar cell modules each having a first end part and a second end part extending parallel with each other; and
a mounting device configured to mount the plurality of solar cell modules onto an installation surface while arranged aligned,
wherein the mounting device comprises
a plurality of beam members each extending along at least one of the first end parts and the second end parts of the plurality of solar cell modules and supporting the plurality of solar cell modules; and
a plurality of fixtures supporting the plurality of beam members and configured to be fastened to the installation surface,
wherein each of the plurality of beam members has a first support part for supporting the first end part of one solar cell module among the plurality of solar cell modules and a second support part for supporting the second end part of another, adjoining solar cell module among the solar cell modules,
wherein each of the plurality of fixtures is configured to be fastened by fastening means to the installation surface on a side of a corresponding beam member among the plurality of beam members where the first support part, not the second support part, of the corresponding beam member is provided,
wherein each of the plurality of fixtures has a mounting base to be fastened by the fastening means to the installation surface, and
wherein each of the plurality of fixtures is configured to grip the corresponding beam member by deforming a part of said each fixture when the mounting base is fastened by the fastening means to the installation surface.

* * * * *